United States Patent Office.

SOLOMON W. KIRK, OF PHILADELPHIA, PENNSYLVANIA, ASSIGNOR OF PART INTEREST TO HENRY THOMAS, OF SAME PLACE.

Letters Patent No. 53,307, dated March 20, 1866; reissue No. 4,314, dated March 28, 1871.

IMPROVEMENT IN THE MANUFACTURE OF STEEL.

The Schedule referred to in these Letters Patent and making part of the same.

I, SOLOMON W. KIRK, of the city of Philadelphia and State of Pennsylvania, have invented certain Improvements in the Manufacture of Steel, of which the following is a specification.

The object of my invention is the production of steel permeated or alloyed with tin, constituting an anti-friction metal that has an unctuous quality, which peculiarly adapts it for bearings or similar uses, and possesses great resisting power, that enables it to withstand the crushing effect of ponderous machinery.

My invention can be employed to utilize the scraps and chippings of tinned iron, which accumulate to so large an extent in manufacturing districts as to make it difficult to find means of transportation or suitable depositories for the refuse.

To this end the invention consists in converting the refuse scraps and chippings into steel, and the following description will enable those skilled in the art to which my invention appertains to fully understand and use the same.

In carrying my invention into effect I first collect the scraps or small particles of refuse tinned iron into suitable quantities, and then compress the mass in a cast-iron mold, to adapt a greater amount of the material to be supplied to a crucible or other receptacle, for the purpose of manufacturing.

The scraps thus prepared are then charged with graphite, charcoal, cast-iron, or other suitable carbonaceous material, in sufficient quantity to impart to the tinned iron from one-half per cent. to two and a half per cent. of carbon, after which it is cast into ingots, annealed, and drawn into bars in the ordinary way.

When the tinned iron is to be manufactured in a furnace instead of a crucible, the cast-iron is charged in the same way as in a puddling-furnace, and when the melting commences the tinned iron is charged in sufficient quantity to take up the desired amount of carbon from the iron, after which it is worked into balls and drawn and hammered in the customary manner.

If desirable, iron and tin varying in proportion of from five to fifteen per cent. may be melted together in a crucible or furnace, and charged and treated as above set forth.

I claim as my invention—

Manufacturing steel from tinned iron or from iron fused with tin, substantially as herein set forth.

SOLOMON W. KIRK.

Witnesses:
FRANKLIN E. FELTON,
EDGAR L. THOMSON.